Patented Feb. 17, 1942

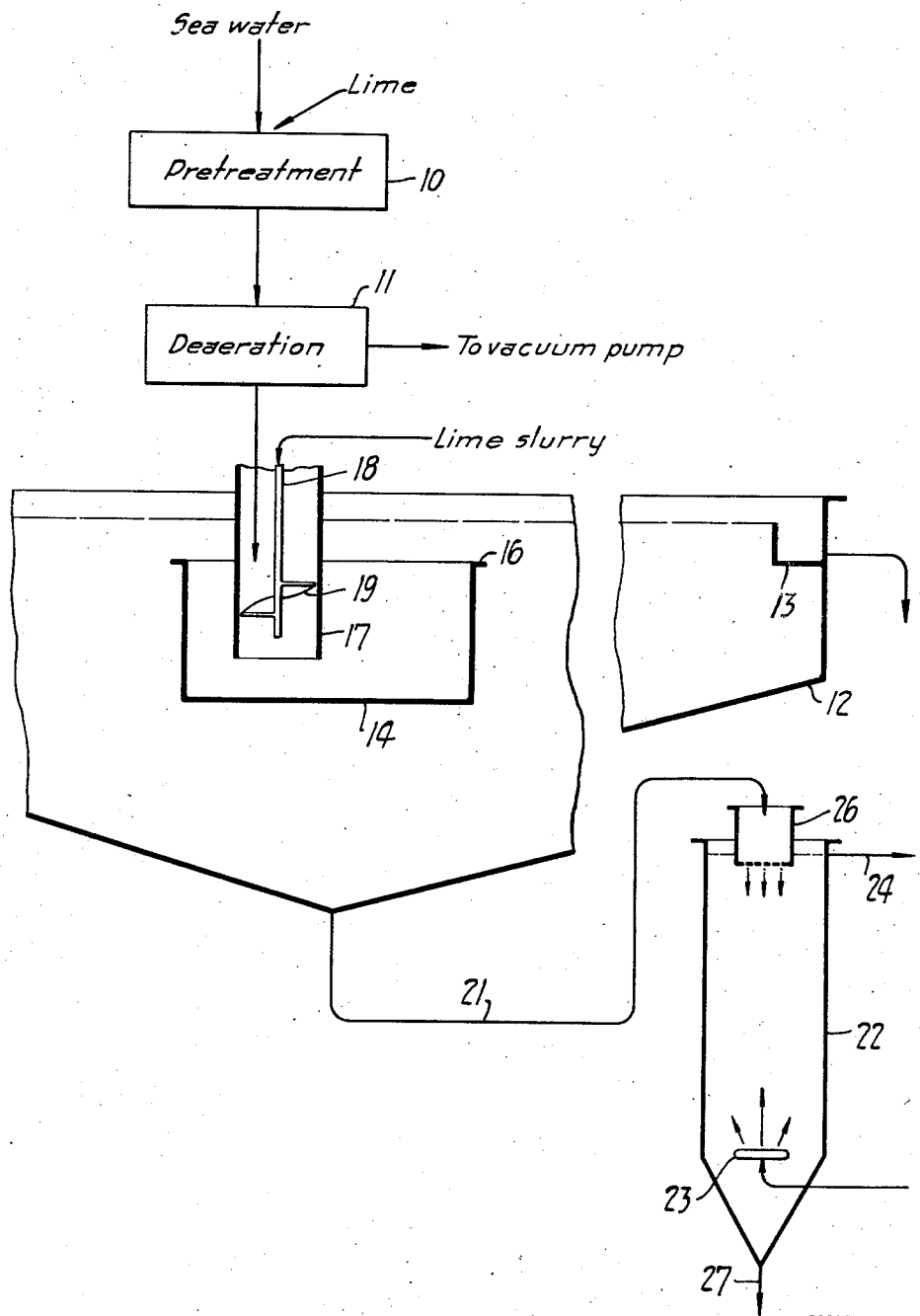

2,273,178

UNITED STATES PATENT OFFICE 2,273,178

PROCESS FOR MANUFACTURE OF MAGNESIUM PRODUCTS FROM BRINE

Neil R. Collins, San Francisco, Calif., assignor to Marine Magnesium Products Corporation, a corporation of Delaware Application October 25, 1938, Serial No. 236,889

7 Claims. (Cl. 23—201)

This invention relates generally to processes for the manufacture of magnesium products, such as magnesium hydroxide, magnesium carbonates, and magnesium oxides, from various brines containing convertible magnesium salts.

In the past, magnesium salts like magnesium sulphate and magnesium chloride, have been precipitated from brines by reaction with calcium hydroxide or like reagent. The brines employed may be sea water, bitterns resulting from the evaporation of sea water, or concentrated inland brines. In this connection reference can be made to Farnsworth and Montgomery Patent 2,021,501 disclosing and claiming a process for producing a relatively rapid settling precipitate of generally crystalline form, Chesny et al. Patent 2,041,047 showing a process applicable to concentrated inland brines, and Chesny 2,089,339 showing a process particularly applicable to the handling of dilute brines like sea water, and capable of producing a relatively pure form of hydrous magnesium hydroxide. For purification of the precipitated magnesium hydroxide, particularly for reducing the sodium chloride content, it has been found advantageous to make use of a washing process such as disclosed and claimed in Farnsworth Patent No. 2,019,488. After production of the magnesium hydroxide this material can be processed for producing a wide variety of magnesium products, as for example magnesium carbonates, and various magnesium oxides.

A general object of the present invention is to improve upon processes or systems of the above character, whereby certain operating characteristics are improved and operation of the system as a whole is greatly facilitated.

Further objects of the invention will appear from the following description in which the preferred embodiment of the invention has been set forth in detail in conjunction with the accompanying drawing.

The single figure of the drawing is a flow sheet illustrating diagrammatically one way of practicing the present invention.

In connection with processes or systems of the above character, I have discovered that their operation can be improved by partial deaeration of the brine immediately prior to the precipitating operation. The deaerating operation can be carried out by causing the brine to flow through a receiver, within which the brine is caused to cascade over grids or baffles. The receiver is connected to a suitable evacuating pump, as for example a pump of the jet type, or a simple mechanical exhaust pump, whereby a vacuum of say 15 to 26 inches of mercury, can be maintained. A considerable amount of dissolved gas is thus removed from the brine, the gas being mainly air, with possibly some carbon dioxide which may be present.

When such deaerated brine is contacted with a suitable precipitating reagent like a lime slurry, the reaction is exothermic and there is a slight increase in temperature. Assuming that the brine is deaerated to a substantial degree, such increase in temperature does not cause occlusion of gas by the precipitated material or attachment of gas bubbles to the particles, which would tend to occur if the brine were not deaerated, and contained a large amount of dissolved air prior to precipitation. It will be evident that the incorporation of gas with the precipitated particles of magnesium hydroxide tends to ' vitate the precipitated material, thus materially etarding the rate of settling, and tending to ca e loss of magnesium hydroxide in the overflow I have also found that the magne 1 hydroxide precipitated from the mother liquor after such a deaerating operation possesses characteristics making it more amenable to certain additional processing. For example e a slurry of precipitated magnesium hy oxide is subjected to a washing operation such as disclosed and claimed in Farnsworth Patent #2,019,488, there is a distinct improvement in the operation of the washing equipment, and in the maintenance of the desired filamentary flocs, which is attributed to a materially lowered content of air or like gases.

The flow sheet of the accompanying dr ig illustrates a complete system making use a series of operations including pre-treatmen of the brine, deaeration by application of a par ial vacuum, precipitation by reacting the brine with calcium hydroxide, settling of the precipitated magnesium hydroxide from the mother liquor in the lower portion of a settling tank, and then washing the magnesium hydroxide slurry. It is presumed that the brine employed is sea water, which has a substantial content of convertible magnesium salts, mainly magnesium chloride and some magnesium sulphate. The pre-treatment operation 10 may vary in accordance with the purity of the resulting magnesium products to be manufactured. Assuming that a relatively pure product is desired, the sea water can be first subjected to chlorination, with settling out of some organic and foreign material, and coarser silt. Thereafter the brine can be reacted with small amounts of lime for the purpose of precipitating calcium bicarbonate dissolved in the brine, as calcium carbonate. A sufficient period of time is afforded for completing the precipitation of the calcium bicarbonate as calcium carbonate, and then the brine is clarified by filtration. The amount of lime employed in the pre-treatment can be substantially as disclosed in the co-pending application of R. E. Clarke, Serial No. 236,890, filed October 25, 1938, or co-pending application in the name of Neil R. Collins, Serial No. 191,594, filed February 21, 1938, whereby a minor fraction of the convertible magnesium salts are precipitated with absorption of a substantial part of the fluorides by the precipitated magnesium hydroxide.

During pre-treatment as described above a substantial rise in temperature of the brine is experienced, due to the exothermic reaction with lime, and (depending upon climatic conditions) possibly in part to exposure of the brine to atmosphere or to the sun's rays. Prior to subjecting the brine to the pre-treatment it is pumped directly from its source of supply, as for example directly from the ocean or from a convenient bay, and therefore it is substantially saturated with air. An increase in temperature therefore tends to cause a condition of super-saturation with respect to dissolved gas, with possibly some evolution of dissolved gas.

The deaeration operation 11 upon the pre-treated brine, can be carried out as previously described. The deaeration need not be complete, but should reduce the content of dissolved gas to a substantial degree, whereby the amount of gas remaining in the solution is far below saturation. For example after deaeration of sea water it may contain from 10 to 12 cc. of dissolved air at a temperature of from 18 to 22° C., as it passes to the precipitating tank. From the deaerating operation 11 the deaerated brine can be conducted directly to the precipitating operation. Should it be necessary to interpose any storage between deaeration and precipitation, such storage should be carried out to avoid substantial re-introduction of gas into the brine. In practice re-introduction of air into the brine is avoided by the simple expedient of directly conducting the brine from deaeration to the reaction chamber through a closed pipe or conduit. Care should be taken to avoid re-introduction of substantial amounts of air through the packing glands of any centrifugal pumps employed.

The precipitating operation indicated in the flow sheet is generally the same as that disclosed in Chesny Patent #2,089,339. Thus a relatively large settling tank 12 is employed, provided with an overflow launder 13. Disposed within this tank there is a reacting chamber 14, having its upper edge 16 below the level of liquid in the tank. Extending down into the reaction chamber 14 there is a conduit 17, through which the brine is introduced. Also extending through conduit 17 there is a pipe 18, by means of which lime slurry, such as of the type disclosed in said Chesny Patent #2,089,339, is introduced to intermingle with the brine. A baffle or flight 19 is shown within conduit 17, in order to impart a rotary movement to brine leaving the lower end of this pipe, thereby aiding gentle inter-mixture with the lime. The reaction between the lime slurry and the brine commences immediately upon their intermixture, and proceeds within the chamber 14, being substantially completed as the brine together with the precipitated magnesium hydroxide flows laterally over the upper edge 16 of the reaction chamber.

By following the teachings of said Chesny Patent 2,089,339, a relatively rapid settling magnesium hydroxide can be obtained, which however is relatively hydrous as distinguished from rapid settling crystalline magnesium hydroxide, having little if any water of hydration. It will be evident that while the reaction is proceeding to completion there is substantially no opportunity for re-absorption of air from the atmosphere. Furthermore there is a minimum amount of re-absorption of air from the atmosphere into the mother liquor within tank 12, because the surface of the liquid within this tank is maintained relatively quiescent.

The precipitated magnesium hydroxide settles to form a thickened slurry in the lower part of the tank 12, where its removal is indicated by line 21. This removed slurry can now be processed by any one of a number of different procedures, in order to produce various marketable magnesium products. Where relatively pure magnesium products are desired, I prefer to subject the slurry to a washing operation in accordance with Farnsworth 2,019,488, as previously stated. Thus in the flow sheet the magnesium hydroxide slurry is shown being conducted to the washing tower 22, in which an upwardly moving column of fresh water is maintained. Header 23 represents introduction of fresh water into the lower part of the tank, while line 24 represents overflow from the upper part of the tower. Device 26 represents means receiving the magnesium hydroxide slurry, and serving to discharge the slurry in the form of a plurality of filamentary flocs into the body of wash liquor. These flocs travel downwardly through the column of wash liquor, to finally agglomerate as a thick slurry in the bottom of the wash tower, for removal as indicated by line 27.

As previously explained it has been found that such a washing tower operates more reliably, with the filamentary flocs being better maintained, when the brine is subjected to deaeration before precipitation, as described above. Without such deaeration the slurry as supplied to the washing tower is saturated or possibly super-saturated with respect to dissolved gas, and as a result the formation of the filamentary flocs is made erratic and it is difficult to maintain such flocs in the manner desired to avoid loss of magnesium hydroxide in the overflow 24, and to avoid undue dilution of the agglomerated material withdrawn from the washing tower.

It will be noted in the foregoing that no reference has been made to deaeration of the lime slurry used in the main reaction. When this slurry is prepared by customary methods involving slaking of lime the heat of the reaction results in a slurry containing an amount of dissolved gas which is substantially less than saturation. Furthermore should the slurry contain considerable dissolved gas, its contact with the proportionally larger amount of deaerated brine results in a liquid mixture which is still short of saturation with respect to dissolved air or gases. If desired however in order to insure a minimum of dissolved gas at the time of reaction, the lime slurry can be subjected to the action of a partial vacuum before being supplied to the reaction chamber 14.

Reference has been made to the improved washing operation obtained by the partially deaerated magnesium hydroxide slurry. Where one does not care to take advantage of improved precipitation and settling by deaeration of the brine before the main reaction, the magnesium hydroxide slurry withdrawn from tank 12 can be subjected to the action of a partial vacuum, before being supplied to the washer. Thus the operation of the washer can be improved irrespective of the nature of the precipitating operation.

I claim:

1. In a process for the manufacture of magnesium hydroxide from brines containing convertible magnesium salts, the steps of deaerating the brine while the brine is at a temperature of the order of from 18 to 22° C., and then contacting the deaerated brine with a hydroxide capable of precipitating magnesium hydroxide.

2. In a process for the precipitation of magnesium hydroxide from brine containing convertible magnesium salts, the steps of deaerating the brine by subjecting the brine to the action of a partial vacuum while the brine is at a temperature of the order of from 18 to 22° C., and then immediately thereafter contacting the brine with a hydroxide capable of precipitating magnesium hydroxide.

3. In a process for the precipitation of magnesium hydroxide from brine containing convertible magnesium salts, the steps of subjecting the brine to pre-treatment for removal of foreign matter, subjecting the pre-treated brine to deareation while the brine is at a temperature of the order of from 18 to 22° C., and then contacting the deaerated brine with a hydroxide capable of precipitating magnesium hydroxide.

4. In a process for the manufacture of magnesium hydroxide from brines containing convertible magnesium salts, the steps of subjecting the brine to deaeration while the brine is at a temperature of the order of from 18 to 22° C, precipitating magnesium hydroxide from the deaerated brine by contacting the same with a hydroxide, permitting the precipitated magnesium hydroxide to settle as a slurry from the mother liquor, and then subjecting the magnesium hydroxide to washing by introducing the magnesium hydroxide slurry in the form of flocs or filaments within a body of washing liquor.

5. In processes for the manufacture of magnesium products from brines containing convertible magnesium salts, wherein the brine is first subjected to pretreatment including reaction with a small amount of lime, the pretreatment being followed successively by intermingling a lime slurry with the brine to precipitate magnesium hydroxide with settling of the magnesium hydroxide from the mother liquor and by contacting flocs of the magnesium hydroxide with wash liquor for purification of the same, the improvement comprising subjecting the brine to deaeration by exposure to a partial vacuum following the pre-treatment of the brine and immediately prior to contacting the brine with the lime slurry the brine during deaeration being at a temperature of the order of 18 to 22° C.

6. In processes for the manufacture of magnesium products from brines containing convertible magnesium salts, wherein the brine is first subjected to pretreatment including reaction with a small amount of lime, the pretreatment being followed by intermingling a lime slurry with the brine to precipitate magnesium hydroxide with settling of the magnesium hydroxide from the mother liquor, the improvement comprising accelerating settling of magnesium hydroxide by deaerating the brine after said pretreatment and before contacting the brine with the lime slurry the brine during such deaeration being at a temperature of the order of from 18 to 22° C.

7. In processes for the manufacture of magnesium products from sea water, in which the sea water is first subjected to pretreatment including reaction with a small amount of lime, the pretreatment being followed successively by intermingling a lime slurry with the sea water to precipitate magnesium hydroxide with settling of the magnesium hydroxide from the mother liquor, and by contacting flocs of the settled magnesium hydroxide with wash liquor for purification of the same, the improvement comprising accelerating settling of magnesium hydroxide and facilitating the washing operation by deaerating the brine after said pretreatment and before contacting the brine with the lime slurry the brine during such deaeration being at a temperature of the order of from 18 to 22° C.

NEIL R. COLLINS.